March 26, 1968     D. TONG     3,374,575
INTEGRALLY MOLDED FLOWER HOLDER
Filed June 29, 1966     2 Sheets-Sheet 1

INVENTOR
DUNCAN TONG
BY
ATTORNEY

March 26, 1968     D. TONG     3,374,575
INTEGRALLY MOLDED FLOWER HOLDER
Filed June 29, 1966     2 Sheets-Sheet 2

INVENTOR
DUNCAN TONG
BY
ATTORNEY

3,374,575
INTEGRALLY MOLDED FLOWER HOLDER
Duncan Tong, 23C Robinson Road,
Victoria, Hong Kong
Filed June 29, 1966, Ser. No. 561,503
4 Claims. (Cl. 47—41.12)

This invention relates to a flower holder and more particularly to an integrally molded unit comprised of a base and a bowl receptacle diverging upwardly from the base with a housing extending centrally of the bowl for the support of flowers therein.

It is the object of the present invention to provide a low cost unit which may be molded in a single operation and which is adapted to support the stems of flowers within a body of holding material disposed within a support for the flowers centrally of the bowl. By varying the holding material, it is possible to impale the flower stems in a flexible porous mass of solidified organic plastic material, such as styrofoam, below which may be disposed a body of heavier material, such as plaster-of-Paris, cement or even metal.

The flower holder in accordance with the invention permits a wide variation of shapes to be imparted to the bowl and correspondingly to the flower support centrally thereof. The top wall of the support is provided with openings therein, leaving the lateral walls thereof solid, so that the bowl of the flower holder may be filled with water up to the top wall, whereby the same may function as a humidifier as well.

The unit in accordance with the invention lends itself well for a flower holder for either natural or artificial plants or flowers, providing a low cost support for a wide range of floral arrangements, in which the contours of the base and bowl of the holder may be combined esthetically with the specific plants and flowers which are adapted to be impaled into the mass of material disposed within the interior of the housing.

Other objects and purposes will appear from the detailed description of the invention following hereinafter, taken in conjunction with the accompanying drawings, wherein FIG. 1 is a vertical sectional view of an embodiment of a flower holder in accordance with the invention with a floral arrangement indicated in elevation;

Figure 1:
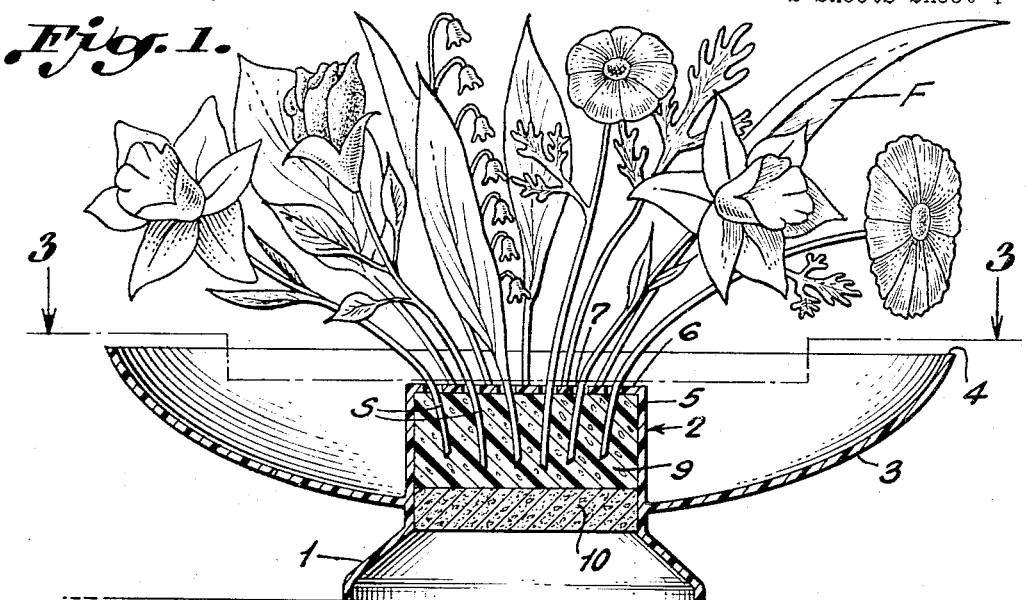

In the drawings is shown a flower holder which is molded in one piece from any organic plastic material and comprises a base 1, a bowl receptacle 3 and a housing 2 extending upwardly from the base 1 and disposed within the bowl receptacle. The housing 2 is molded with a solid lateral wall 5 and with a top wall 6 which is provided with a plurality of openings or perforations 7. The wall 6 is disposed below the level of the top edge 4 of the bowl 3.

The interior of the housing 2 is fully open at the end of the base 1 so that a body of holding material, for example, a block 9 of flexible porous solidified Styrofoam, sponge rubber or other organic plastic may be inserted into the interior of the housing.

Figure 2:
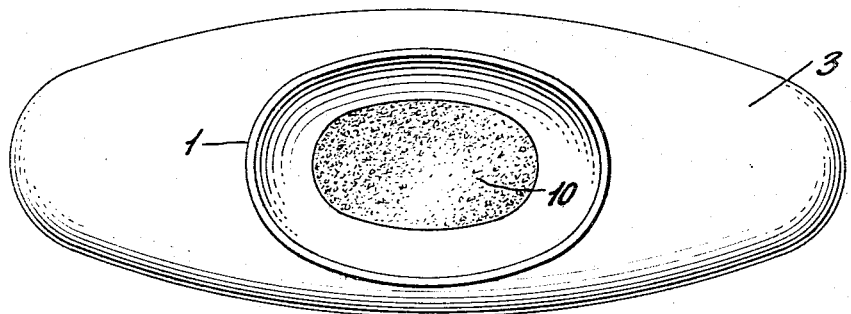
FIG. 2 is a bottom view of FIG. 1.
Figure 3:
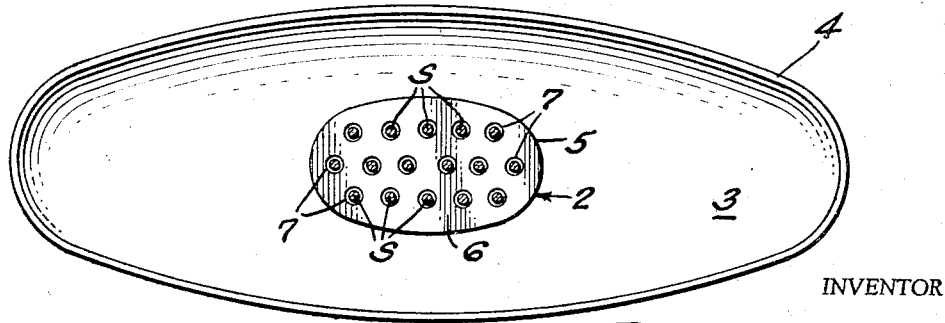
FIG. 3 is a horizontal sectional view along line 3—3 of FIG. 1.

As clearly shown in FIGS. 2 and 3, the bowl 3 is of oval-shaped and the base 1 and housing 2 are shaped correspondingly. The block 9 of Styrofoam is shaped correspondingly to the horizontal cross-section of the housing so that the same may be inserted and retained therein frictionally, without need for any other means of retention. On the other hand, if desired, a mass 10 of cement or plaster may be inserted into the bottom of the housing 2, to retain the block of Styrofoam in place and to add to the weight of the unit so that the same is characterized by a high degree of stability.

The stems S of the flowers or plants F are adapted to be impaled into the mass of holding material upon passage of the stems through the openings 7 in the top wall 6, and the flowers are capable of adjustment and re-positioning in order to obtain the most esthetic floral effects.

The disposition of the top wall 6 below the level of the top edge 4 of the bowl makes possible the filling of the bowl with water below the level of the wall 6, so that the same may function as a humidifier. On the other hand, if natural flowers are impaled into the block of Styrofoam the water level may extend above the top 5 for the purpose of feeding water to the porous holding mass to help preserve the flowers in a fresh state for a longer period.

The invention contemplates the molding of the flower holder and all its component parts in a single molding operation, and the shapes and outlines of the holders may be varied in many different ways.

Figure 4:
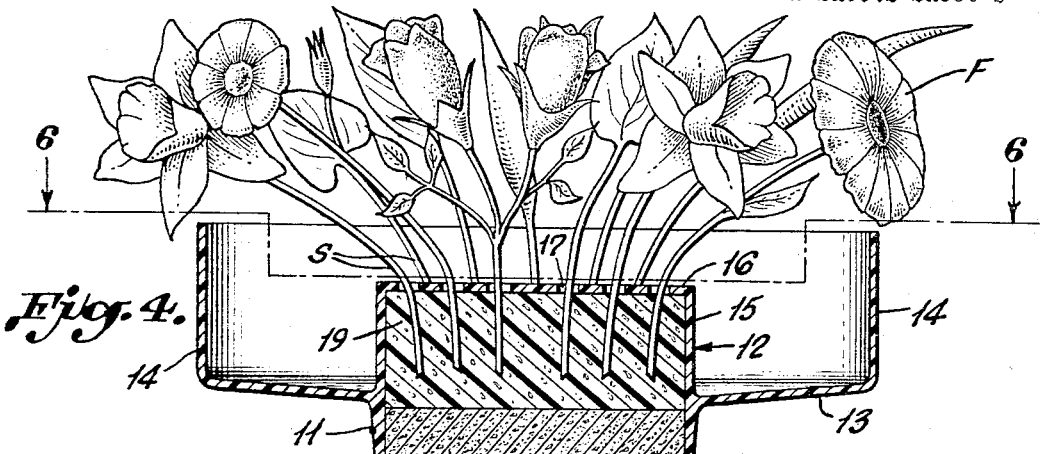
FIG. 4 is a vertical sectional view of a second embodiment of the invention.
Figure 5:
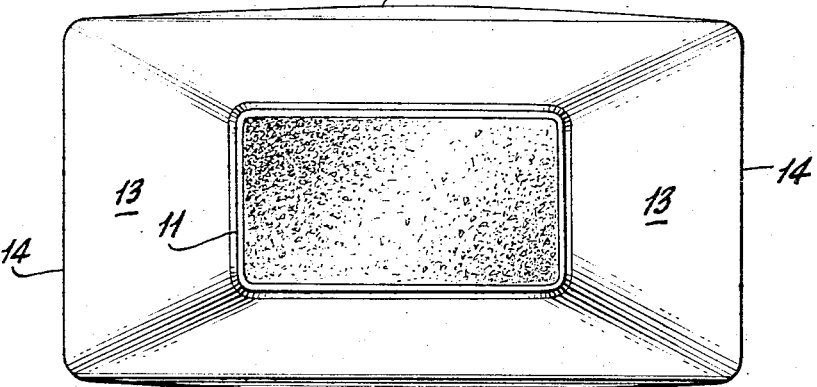
FIG. 5 is a bottom view of FIG. 4.
Figure 6:
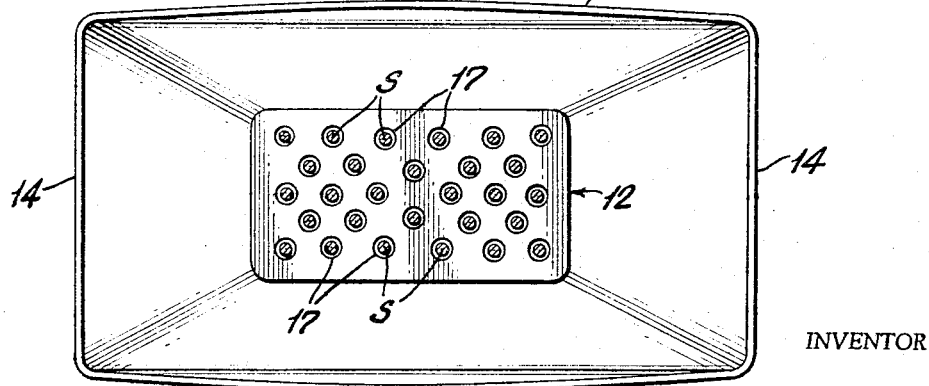
FIG. 6 is a horizontal sectional view along line 6—6 of FIG. 4.

A second embodiment of the invention is shown in FIGS. 4 to 6. In this embodiment the outline of the flower holder is generally rectangular and the outline of the base 11 is shaped correspondingly. The base 11 presents a continuation of the substantially rectangular housing 12 which extends above the junction line of the bowl receptacle formed of bottom 13, sloping slightly to the horizontal, and vertical lateral walls 14. The lateral walls 15 of the housing are solid and the top wall 16 is provided with perforations or openings 17 for the reception of the plant or floral stems S forming part of the floral arrangement F.

The provision of a substantially rectangular block 19 of porous plastic, such as Styrofoam, within the interior of the housing 12, which may be backed by a mass of hardened plaster-of-Paris, provides a stable flower holder which may be fabricated at low cost.

Of course, the flower holders may assume different shapes, of polygonal as well as circular outline, to meet a wide range of designs in floral arrangements.

While I have described my invention as embodied in specific forms and as operating in specific manners for purposes of illustration, it should be understood that I do not limit my invention thereto, since various modifications will suggest themselves to those skilled in the art without departing from the spirit of my invention, the scope of which is set forth in the annexed claims.

I claim:

1. An integrally molded flower holder of hardened plastic material, comprising a base and a bowl receptacle diverging upwardly from said base, an open-bottomed housing extending upwardly from said base within the confines of said bowl with the top wall of said housing below the mouth of said bowl, said top wall having a plurality of perforations therein for the reception of the stems of flowers therethrough, said housing containing in its interior a body of flexible porous holding material which is insertable through the bottom thereof for retaining said stems in impaled position while the flowers assume natural positions above the mouth of said bowl, and a mass of solid material heavier than said porous flexible material in said housing below said last-mentioned material to impart stability to said flower holder.

2. A device as set forth in claim 1 wherein said base flares downwardly from the junction area of the exterior of the housing and bowl.

3. A device as set forth in claim 1 wherein said base is a downward extension of the wall of the housing below the junction of the bowl with the external wall of the housing.

4. A device as set forth in claim 1 wherein the body of holding material fits closely the interior of said housing adjacent to said perforated top wall.

References Cited

UNITED STATES PATENTS

| | | | |
|---|---|---|---|
| 1,596,716 | 8/1926 | Clarke | 47—41.13 |
| 2,815,606 | 12/1957 | Quackenbush | 47—41 |
| 3,003,284 | 10/1961 | Smithers | 47—41.12 |

FOREIGN PATENTS 1,145,853   5/1957   France.

ROBERT E. BAGWILL, *Primary Examiner.*